United States Patent
Cao et al.

(10) Patent No.: US 12,041,580 B2
(45) Date of Patent: *Jul. 16, 2024

(54) PHASE TRACKING FOR USER EQUIPMENT PAGING

(71) Applicant: QUALCOMM Incorporated, San Diego, CA (US)

(72) Inventors: Yiqing Cao, Beijing (CN); Xiao Feng Wang, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 17/594,589

(22) PCT Filed: May 15, 2020

(86) PCT No.: PCT/CN2020/090453
§ 371 (c)(1),
(2) Date: Oct. 22, 2021

(87) PCT Pub. No.: WO2020/238651
PCT Pub. Date: Dec. 3, 2020

(65) Prior Publication Data
US 2022/0210765 A1     Jun. 30, 2022

(30) Foreign Application Priority Data

May 30, 2019   (WO) ................ PCT/CN2019/089192

(51) Int. Cl.
*H04W 68/02*     (2009.01)
*H04L 5/00*     (2006.01)

(52) U.S. Cl.
CPC ........... *H04W 68/02* (2013.01); *H04L 5/0048* (2013.01)

(58) Field of Classification Search
CPC .... H04W 68/02; H04L 5/0048; H04L 5/0085; H04L 5/0092; H04L 25/0224; H04L 5/0051; H04L 5/0007
See application file for complete search history.

(56) References Cited

U.S. PATENT DOCUMENTS 10,820,331 B2 * 10/2020  Yoo .......................... H04L 5/005
11,695,595 B2 *  7/2023  Cao ...................... H04L 25/0226
                                                                  375/262

(Continued)

FOREIGN PATENT DOCUMENTS

CN       108112079 A      6/2018
CN       109120566 A      1/2019

(Continued)

OTHER PUBLICATIONS

Supplementary European Search Report—EP20814636—Search Authority—Munich—Jan. 9, 2023.

(Continued)

*Primary Examiner* — Kenneth T Lam
(74) *Attorney, Agent, or Firm* — Harrity & Harrity, LLP

(57) ABSTRACT

Various aspects of the present disclosure generally relate to wireless communication. In some aspects, a user equipment (UE) may receive an indication that a high Doppler configuration for UE paging is activated. The UE may detect, based at least in part on receiving the indication that the high Doppler configuration is activated, a phase tracking reference signal (PTRS) for a paging communication. Numerous other aspects are provided.

30 Claims, 12 Drawing Sheets

(56) References Cited

U.S. PATENT DOCUMENTS

| | | | |
|---|---|---|---|
| 2008/0101306 A1* | 5/2008 | Bertrand | H04L 27/2613 370/344 |
| 2013/0114756 A1* | 5/2013 | Jia | H04L 5/0048 375/295 |
| 2019/0044686 A1* | 2/2019 | Sakamoto | H04B 7/01 |
| 2020/0077285 A1* | 3/2020 | Yu | H04W 72/12 |
| 2020/0145129 A1* | 5/2020 | Nammi | H04W 4/027 |
| 2020/0162303 A1 | 5/2020 | Kim et al. | |
| 2020/0163078 A1 | 5/2020 | Jiang et al. | |
| 2020/0186208 A1* | 6/2020 | Molés Cases | H04B 7/0456 |
| 2021/0160025 A1* | 5/2021 | Gao | H04L 5/0094 |
| 2021/0168011 A1* | 6/2021 | Davydov | H04L 1/0003 |

FOREIGN PATENT DOCUMENTS

| | | |
|---|---|---|
| CN | 109565429 A | 4/2019 |
| CN | 109565431 A | 4/2019 |
| KR | 20180136774 A | 12/2018 |
| WO | 2012103932 A1 | 8/2012 |
| WO | 2017026975 A1 | 2/2017 |
| WO | 2018182150 A1 | 10/2018 |
| WO | 2018237258 A1 | 12/2018 |
| WO | WO-2018227601 A1 | 12/2018 |

OTHER PUBLICATIONS

Thales: "NR-NTN: Chap 7.3—NR Modifications to Support the Non-Terrestrial Network", 3GPP TSG RAN1 Meeting #93, R1-1807794, TR38.811 Chap 7.3 NR Impacts V10, 3rd Generation Partnership Project (3GPP), Mobile Competence Centre, 650, Route Des Lucioles, F-06921 Sophia-Antipolis Cedex, France, No. Busan, Korea, May 21, 2018-May 25, 2018, May 29, 2018 (May 29, 2018), 43 Pages, XP051463502, Sections 7.3.2.1.1 and 7.3.7.1.1.

International Search Report and Written Opinion—PCT/CN2019/089192—ISA/EPO—Mar. 6, 2020.

International Search Report and Written Opinion—PCT/CN2020/090453—ISA/EPO—Jul. 29, 2020.

Nokia, et al., "Evaluation of DMRS Enhancement for V2V with High Doppler", 3GPP Draft, R1-162538, 3GPP TSG RAN WG1 Meeting #84bis, 3rd Generation Partnership Project (3GPP), Mobile Competence Centre; 650, Route Des Lucioles; F-06921 Sophia-Antipolis, vol. RAN WG1, No. Busan, Korea; Apr. 11, 2016-Apr. 15, 2016, Apr. 1, 2016, XP051079823, pp. 1-10, Retrieved from the Internet: URL: http://www.3gpp.org/ftp/tsg_ran/WG1_RL1/TSGR1_84b/Docs/ [retrieved on apr. 1, 2016].

ZTE et al., "Discussion on RS for Phase Tracking", 3GPP TSG RAN WG1 Meeting#88, R1-1701817, Feb. 17, 2017 (Feb. 17, 2017), pp. 1-9.

* cited by examiner

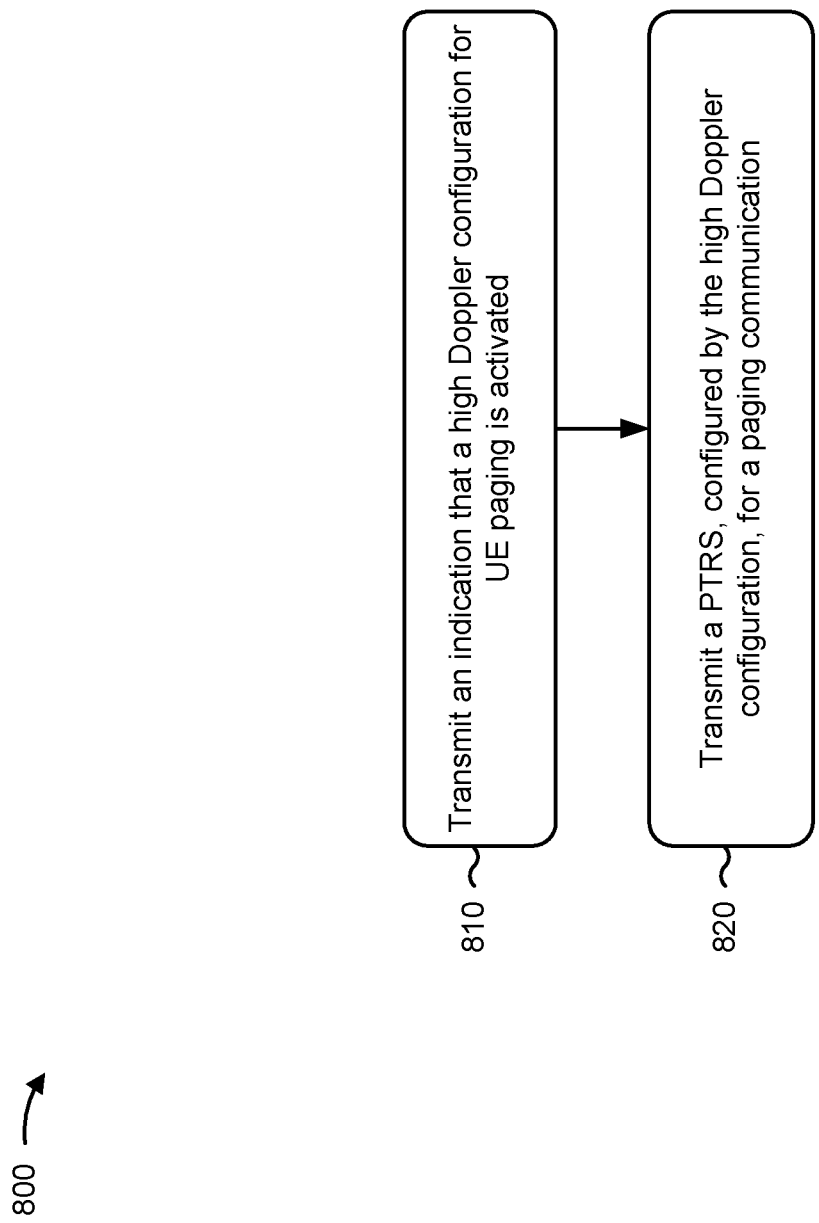

PHASE TRACKING FOR USER EQUIPMENT PAGING

CROSS-REFERENCE TO RELATED APPLICATIONS

This application is a 371 national stage of PCT Application No. PCT/CN2020/090453 filed on May 15, 2020, entitled "PHASE TRACKING FOR USER EQUIPMENT PAGING," which claims priority to International Patent Application No. PCT/CN2019/089192, filed on May 30, 2019, entitled "PHASE TRACKING FOR USER EQUIPMENT PAGING," which are hereby expressly incorporated by reference herein.

FIELD OF THE DISCLOSURE

Aspects of the present disclosure generally relate to wireless communication and to techniques and apparatuses for phase tracking for user equipment (UE) paging.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication that a high Doppler configuration for UE paging is activated; and detecting, based at least in part on receiving the indication that the high Doppler configuration is activated, a phase tracking reference signal (PTRS) for a paging communication, wherein the PTRS is configured by the high Doppler configuration.

In some aspects, a UE for wireless communication may include memory and one or more processors operatively coupled to the memory. The memory and the one or more processors may be configured to receive an indication that a high Doppler configuration for UE paging is activated; and detect, based at least in part on receiving the indication that the high Doppler configuration is activated, a PTRS for a paging communication, wherein the PTRS is configured by the high Doppler configuration.

In some aspects, a non-transitory computer-readable medium may store one or more instructions for wireless communication. The one or more instructions, when executed by one or more processors of a UE, may cause the one or more processors to receive an indication that a high Doppler configuration for UE paging is activated; and detect, based at least in part on receiving the indication that the high Doppler configuration is activated, a PTRS for a paging communication, wherein the PTRS is configured by the high Doppler configuration.

In some aspects, an apparatus for wireless communication may include means for receiving an indication that a high Doppler configuration for UE paging is activated; and means for detecting, based at least in part on receiving the indication that the high Doppler configuration is activated, a PTRS for a paging communication, wherein the PTRS is configured by the high Doppler configuration.

In some aspects, a method of wireless communication, performed by a base station (BS), may include transmitting an indication that a high Doppler configuration for UE paging is activated; and transmitting a PTRS, configured by the high Doppler configuration, for a paging communication.

In some aspects, a BS for wireless communication may include memory and one or more processors operatively coupled to the memory. The memory and the one or more processors may be configured to transmit an indication that a high Doppler configuration for UE paging is activated; and transmit a PTRS, configured by the high Doppler configuration, for a paging communication.

In some aspects, a non-transitory computer-readable medium may store one or more instructions for wireless communication. The one or more instructions, when executed by one or more processors of a BS, may cause the one or more processors to: transmit an indication that a high Doppler configuration for UE paging is activated; and transmit a PTRS, configured by the high Doppler configuration, for a paging communication.

In some aspects, an apparatus for wireless communication may include means for transmitting an indication that a high Doppler configuration for UE paging is activated; and means for transmitting a PTRS, configured by the high Doppler configuration, for a paging communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station (BS), in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
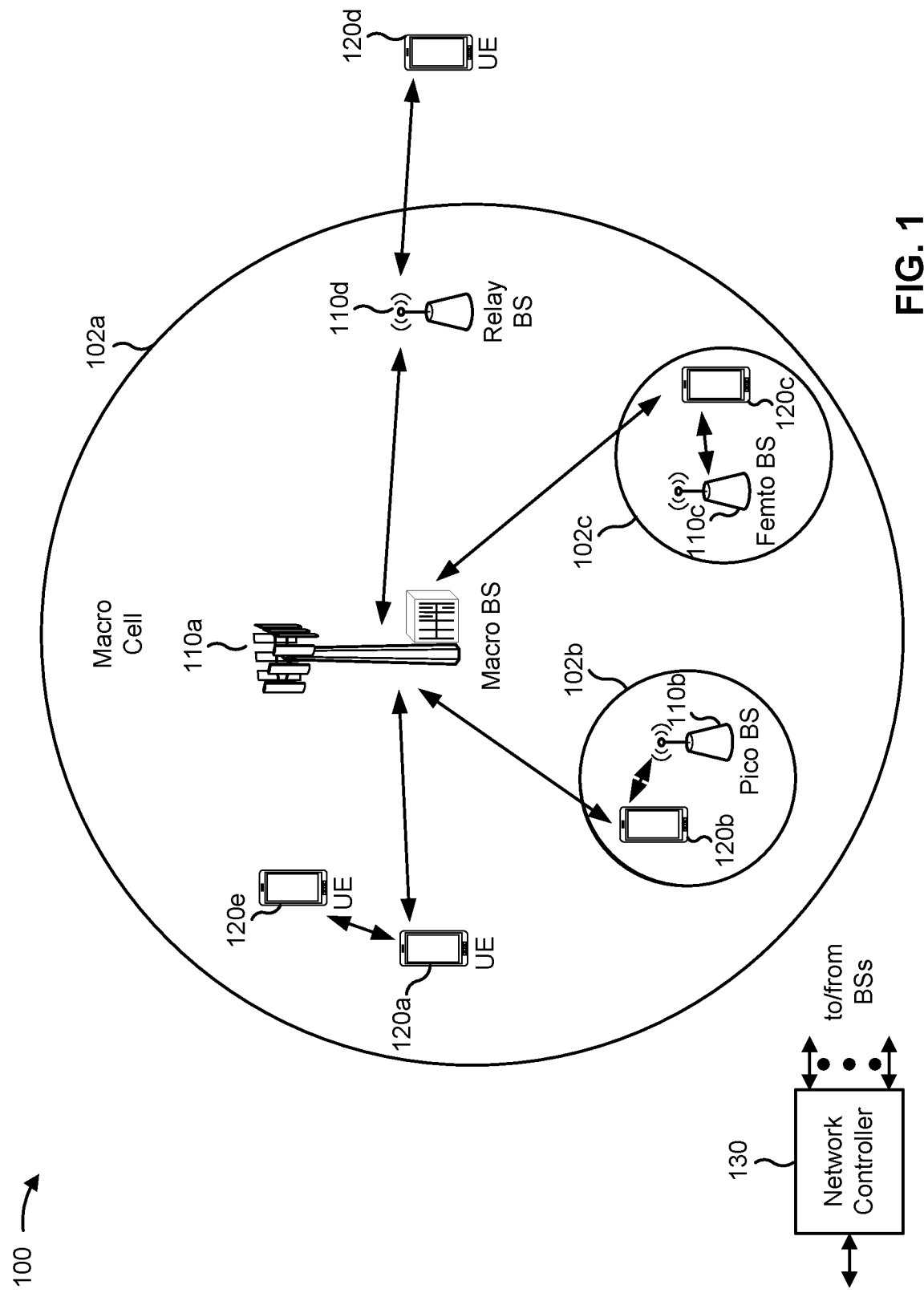
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may remain stationary or move according to the location of a mobile BS. For example, wireless network 100 may include one or more a non-terrestrial network (NTN) deployments in which non-stationary satellites may be used as BSs. In this case, the satellites may communicate directly and/or indirectly with other entities in wireless network 100 using satellite communication. The other entities may include UEs, other satellites in the one or more NTN deployments, other types of BSs (e.g., stationary or ground-based BSs), one or more components and/or devices included in a core network of wireless network 100, and/or the like.

In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
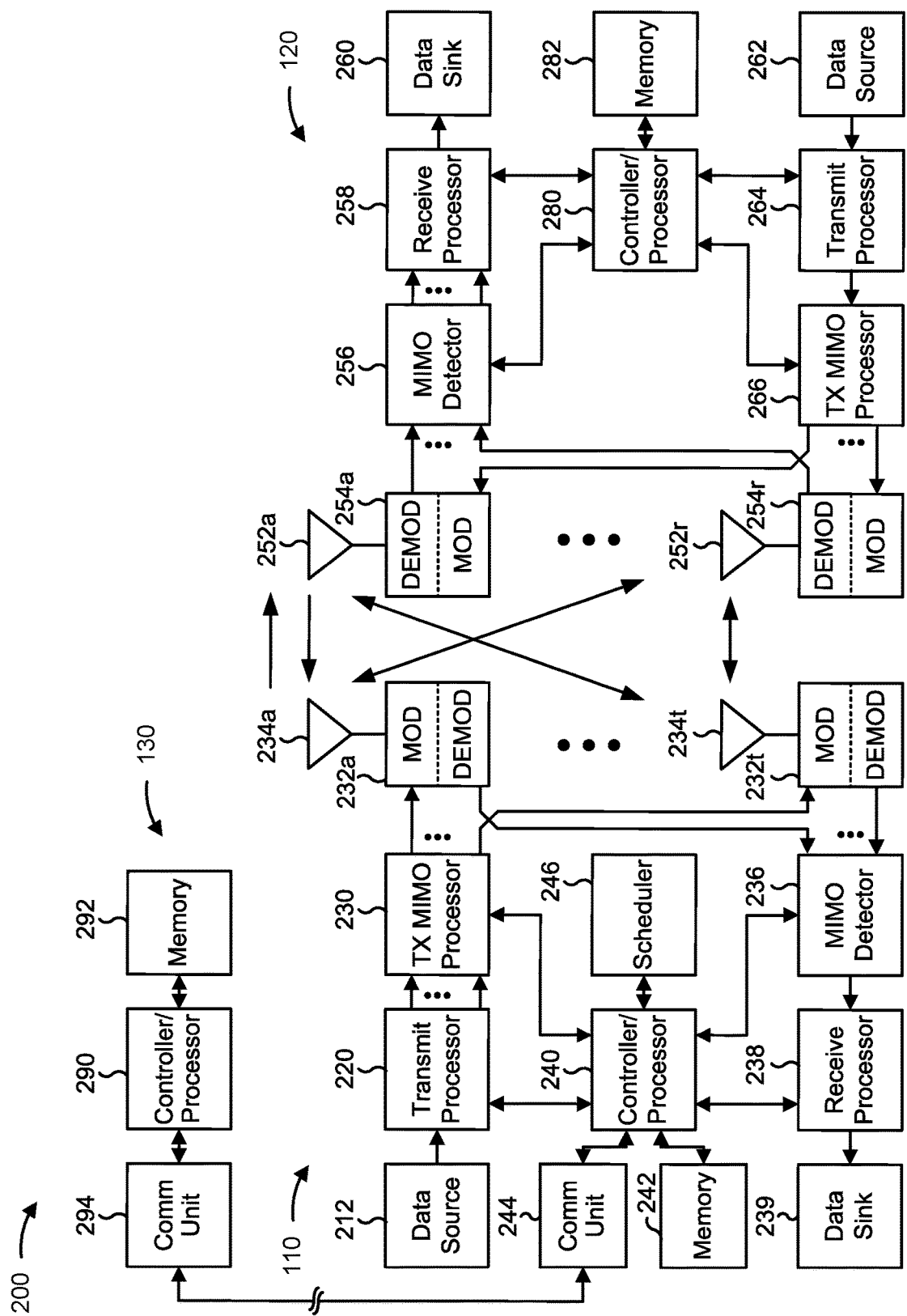
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and may communicate with network controller 130 via communication unit 244 (e.g., via a wireline backhaul, via a wireless backhaul, via a satellite communication link, and/or the like). Network controller 130 may include communication unit 294, controller/processor 290, and memory 292.

Controller/processor 240 of base station 110, controller/processor 280 of UE 120, and/or any other component(s) of FIG. 2 may perform one or more techniques associated with phase tracking reference signal configuration for a random access procedure, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication that a high Doppler configuration for UE paging is activated, means for detecting, based at least in part on receiving the indication that the high Doppler configuration is activated, a PTRS for a paging communication, wherein the PTRS is configured by the high Doppler configuration, and/or the like. In some aspects, such means may include one or more components of UE 120 described in connection with FIG. 2.

In some aspects, base station 110 may include means for transmitting an indication that a high Doppler configuration for UE paging is activated, means for transmitting a PTRS, configured by the high Doppler configuration, for a paging communication, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
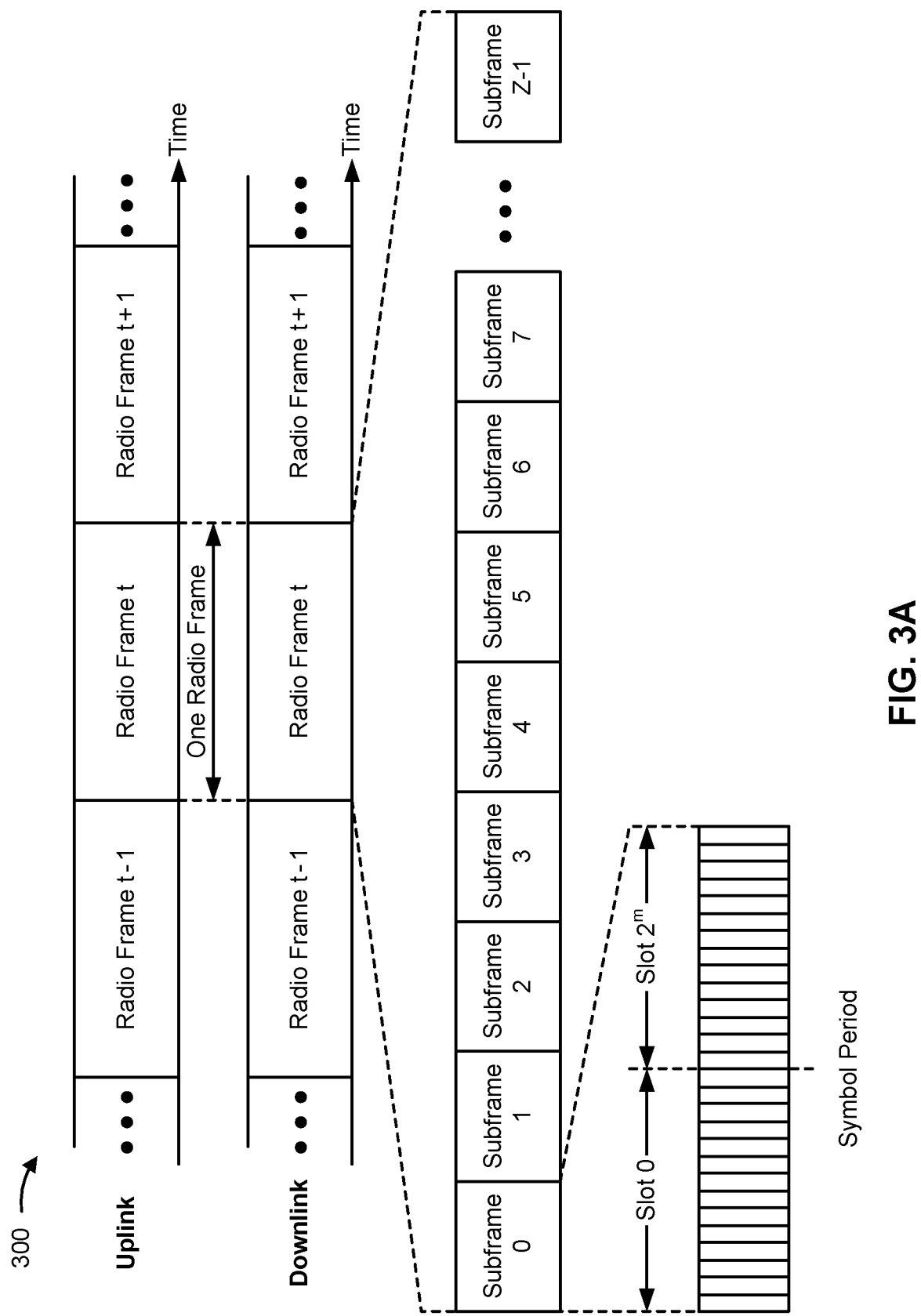
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
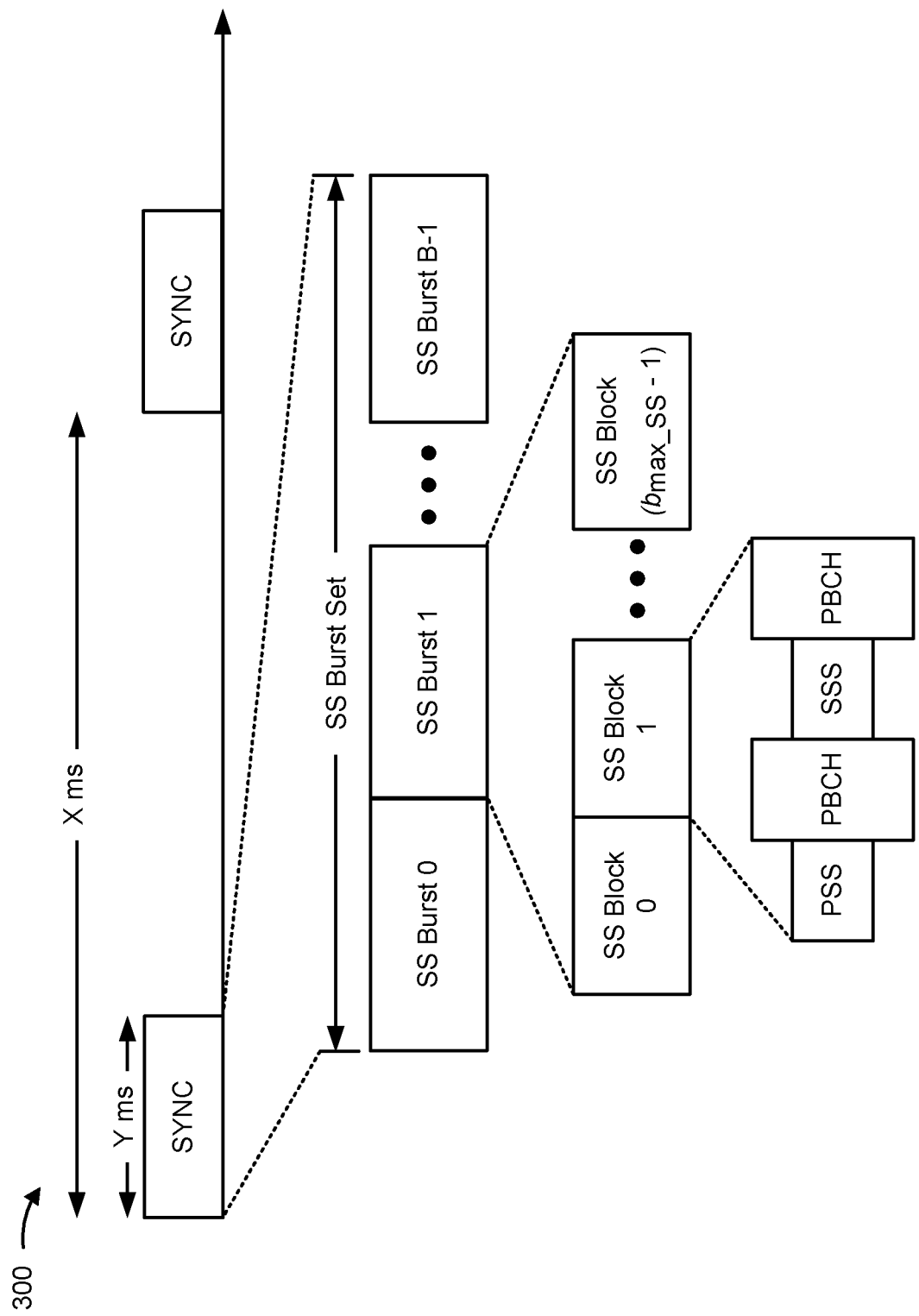
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot. In some aspects, the base station may configure one or more control resource sets (CORESETs) for a UE.

A CORESET may indicate time-domain and/or frequency-domain resources that carry PDCCH communications. The PDCCH communications may further schedule PDSCH communications. For example, a PBCH communication may specify or indicate a CORESET for remaining minimum system information (RMSI) and/or other system information (OSI), which may be transmitted on a PDSCH. A UE may identify the CORESET (e.g., CORESET0) indicated in the payload of the PBCH communication, may detect and decode one or more PDCCH communications associated with the RMSI and/or OSI to identify one or more parameters for the RMSI and/or OSI, and may detect and decode RMSI communications and/or OSI communications on the PDSCH based at least in part on the one or more parameters.

As indicated above, FIGS. 3A and 3B are provided as examples. Other examples may differ from what is described with regard to FIGS. 3A and 3B.

Figure 4:
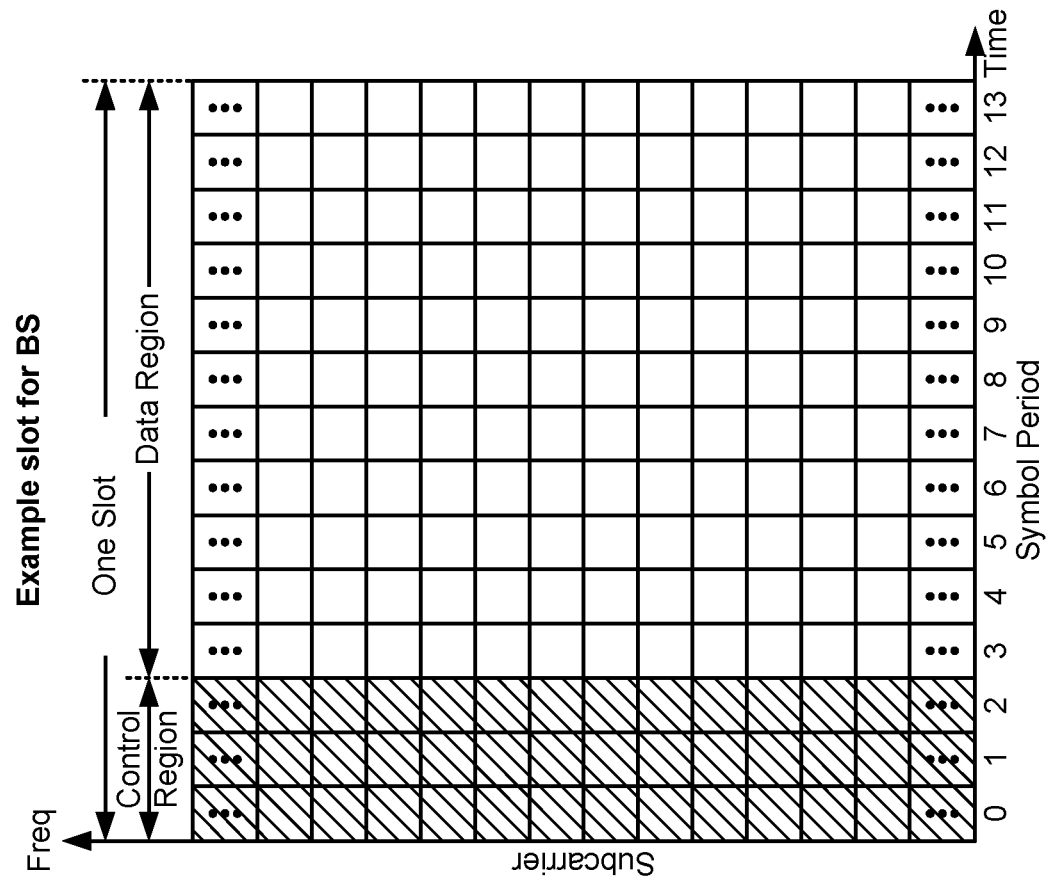
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems and/or access methods, such as NTN configurations and/or access methods. New Radio (NR) may refer to radios configured to operate according to a new air interface (e.g., other than Orthogonal Frequency Divisional Multiple Access (OFDMA)-based air interfaces)

or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data. In some aspects, DL/UL control data may be located in a control region or one or more CORESETs of a slot.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In NR, a PTRS was introduced for phase noise tracking and to compensate for phase noise in a transmitted signal, particularly a signal transmitted using a millimeter wave frequency. In a transmitter, the phase noise increases as the operating frequency increases. Phase noise is generated by a local oscillator in the transmitter, and may introduce constant or common phase error (CPE) or other phase noise errors into the transmitted signal, which degrades demodulation performance. The PTRS may be used to track phase noise in a local oscillator (e.g., in a transmitter and/or a receiver) and to suppress such phase noise, especially at millimeter wave frequencies.

A PTRS may be present and transmitted in a downlink data channel (e.g., a PDSCH) and/or an uplink data channel (e.g., a physical uplink shared channel (PUSCH)). Because PDSCH and PUSCH communications may be transmitted with high modulation and coding schemes (MCSs), which are more susceptible to degraded demodulation due to phase noise, the PTRS may be transmitted in the PDSCH and the PUSCH. A lower or fixed MCS may be used for paging communications, which may be transmitted to cause a UE to transition from an idle state or inactive state to an active state, making paging communications more robust against phase noise. Thus, to reduce signaling overhead, PTRS might not be transmitted for paging communication.

However, some NR deployments may be subject to a large Doppler shift due to a high relative speed between a BS and a UE, such as an NTN deployment that uses non-stationary satellites as BSs (e.g., a low Earth orbit (LEO) satellite, a medium Earth orbit (MEO) satellite, a geostationary equatorial orbit (GEO), and/or the like). This large Doppler shift increases the difficulty of channel estimation due to a frequency offset and/or a timing offset resulting from the large Doppler shift, which can cause degraded performance in decoding and/or demodulating paging communications.

Some techniques and apparatuses described herein introduce a high Doppler configuration for UE paging to assist with channel estimation and phase noise correction in high Doppler scenarios, which may occur, for example, in NTN deployments. A BS (e.g., a non-stationary satellite in an NTN deployment) may configure one or more high Doppler configurations for UE paging, in which the BS may transmit one or more PTRSs for paging communications that are transmitted to cause the UE to transition from an idle state or inactive state to an active state. Moreover, the BS may transmit an indication of whether a high Doppler configuration for UE paging is activated, may transmit an indication of the high Doppler configuration (e.g., the one or more parameters for the high Doppler configuration), and/or the like. In this way, a UE that monitors for paging communications from the BS may determine whether the UE is to use a high Doppler configuration for the paging communications, may identify the one or more parameters for the high Doppler configuration, and may use the one or more PTRSs transmitted from the BS to mitigate the effects of large Doppler shift due to the high relative speed between the BS and the UE. This increases demodulation performance for paging communications, which reduces latency, increases reliability, and improves network performance.

Figure 5A:
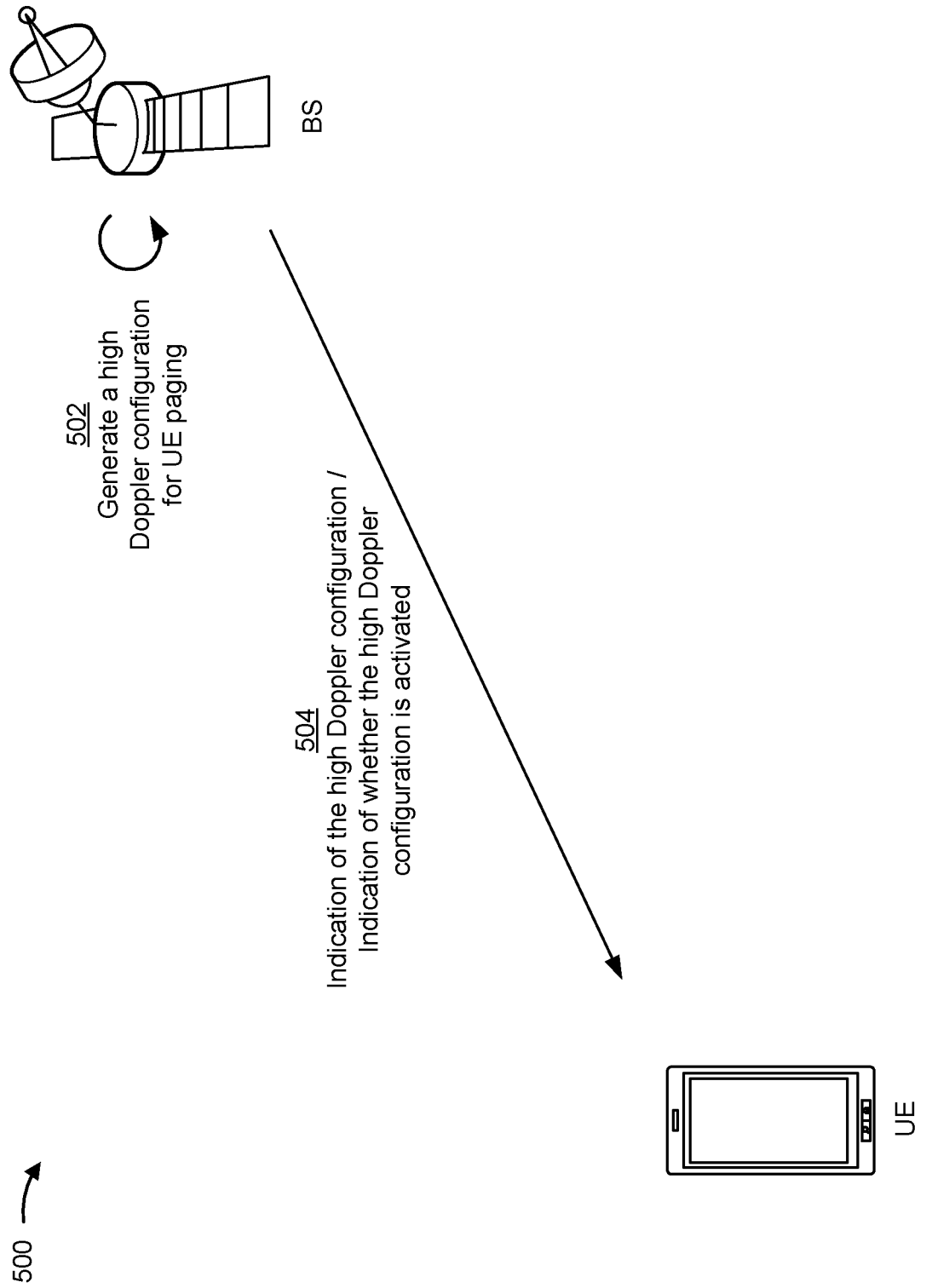
FIGS. 5A-6C are diagrams illustrating one or more examples of phase tracking for UE paging, in accordance with various aspects of the present disclosure.
Figure 5B:
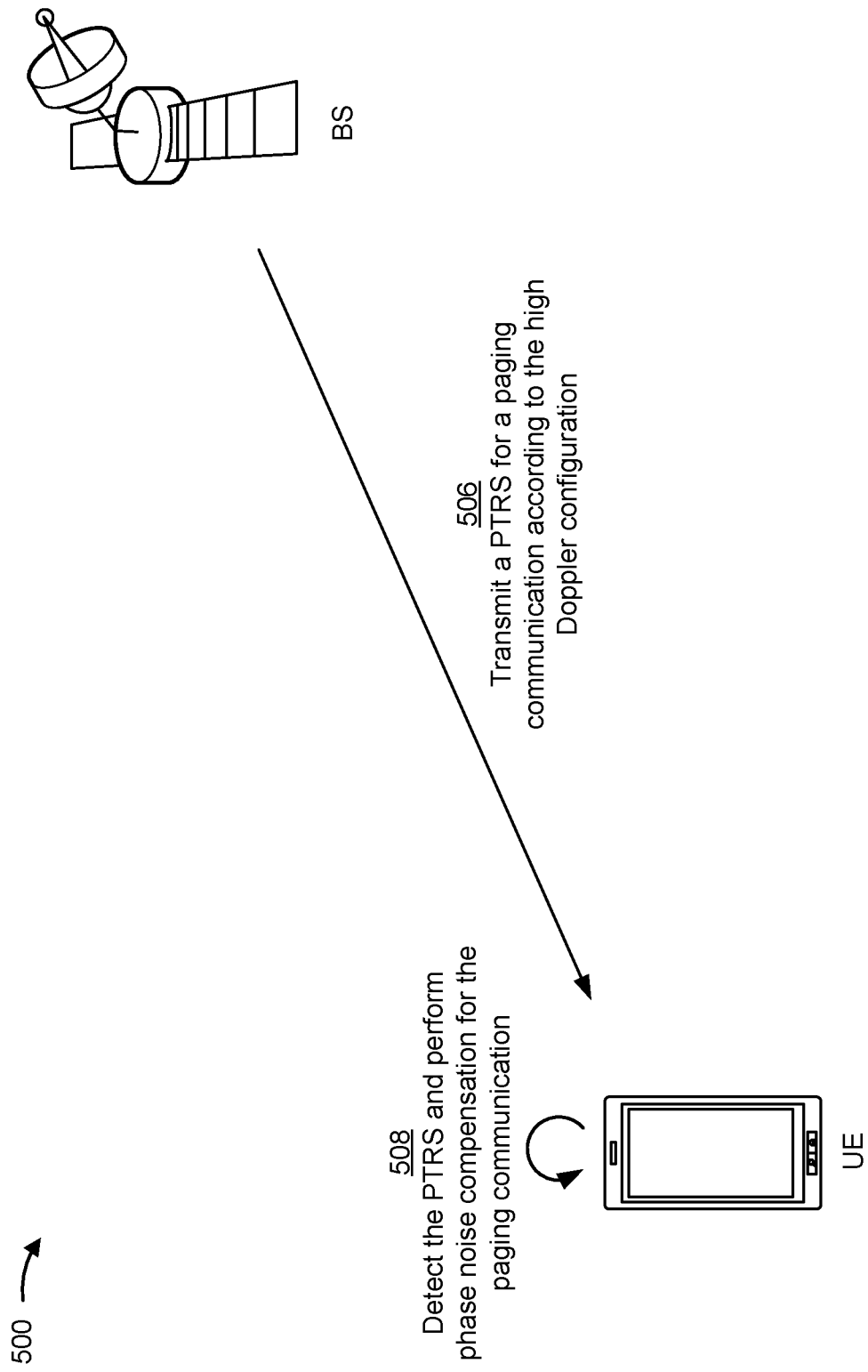

FIGS. 5A and 5B are diagrams illustrating one or more examples 500 of phase tracking for UE paging, in accordance with various aspects of the present disclosure. As shown in FIG. 5, examples 500 may include communication between a BS (e.g., BS 110) and a UE (e.g., UE 120). In some aspects, the BS may be included in an NTN deployment of a wireless network (e.g., wireless network 100). In this case, the BS may be implemented by a non-stationary satellite that communicates directly with the UE via a satellite communication link and/or another type of non-terrestrial communication link. In some aspects, the BS and the UE may communicate using a frame structure, such as frame structure 300 illustrated in FIG. 3A and/or another frame structure.

Since the BS may be a non-stationary satellite that travels at a high speed relative to the UE (e.g., on the order of thousands of kilometers per second), this high speed of travel may cause a high Doppler shift to occur between the BS and the UE, which in turn may cause phase noise (e.g., fast phase variations in time and/or frequency) to occur on the satellite communication link.

As shown in FIG. 5A, and by reference number 502, to compensate for and/or mitigate the effects of the high Doppler shift, the BS may generate a high Doppler configuration for paging communications that are transmitted to cause the UE to transition from an idle state or inactive state to an active state. The high Doppler configuration may configure, among other things, a PTRS for one or more paging communications that are typically not configured with a PTRS due to having a lower level MCS (e.g., quadrature phase shift keying (QPSK) and/or the like).

In some aspects, the high Doppler configuration may indicate, include, and/or specify one or more parameters for the one or more paging communications. The one or more parameters may include one or more PTRS parameters for transmitting one or more PTRSs for the one or more paging communications. In some aspects, the one or more PTRS parameters may include a parameter that indicates and/or specifies that the BS is to transmit a PTRS for the one or more paging communications.

In some aspects, the one or more PTRS parameters may include a parameter that indicates and/or specifies a time density for a PTRS. The time density for a PTRS may specify a periodicity for transmitting a PTRS for RMSI communications, may specify a periodicity for transmitting a PTRS for OSI communications, and/or the like. In some aspects, the BS may determine the time density for a PTRS based at least in part on an MCS level for the corresponding type of communication. For example, the BS may determine the time density based at least in part on a mapping indicated in Table 1 below.

TABLE 1

| Scheduled MCS | Time density |
| --- | --- |
| $I_{MCS}$ < ptrs-MCS1 | j |
| ptrs-MCS1 < $I_{MCS}$ < ptrs-MCS2 | 4 |
| ptrs-MCS2 < $I_{MCS}$ < ptrs-MCS3 | 2 |
| ptrs-MCS3 < $I_{MCS}$ < ptrs-MCS4 | 1 |

In this case, the high Doppler configuration may index into the table or explicitly specify the time density (e.g., may identify an index, included in the table, associated with the time density). $I_{MCS}$ may correspond to the MCS of the one or more paging communications and ptrs-MCS1-MSC4 may correspond to different levels of MCS. In some aspects, j may be a configurable value such that, if $I_{MCS}$<ptrs-MCS1 (e.g., which may be the case for the one or more paging communications), the BS may transmit a PTRS every j symbols. Example values for j may include 1, 2, 4, 8, and/or the like. As an example, if j=1, the BS may transmit a PTRS for paging communications every PDSCH symbol of a particular frequency (or set of frequencies) on the satellite communication link. In some aspects, the parameter that indicates and/or specifies a time density for a PTRS may further specify whether the PTRS is to be transmitted in symbols in which a DMRS is transmitted. As an example, the parameter that indicates and/or specifies a time density for a PTRS may further specify that the PTRS is not to be transmitted in symbols in which a DMRS is transmitted.

In some aspects, the one or more PTRS parameters may include a parameter that indicates and/or specifies a frequency density for a PTRS. The frequency density for a PTRS may specify a bandwidth for a PTRS for paging communications. In some aspects, the BS may determine the frequency density for a PTRS based at least in part on a bandwidth for the satellite communication link, based at least in part on a system bandwidth associated with the BS, and/or the like. For example, the BS may determine the frequency density based at least in part on a mapping indicated in Table 2 below.

TABLE 2

| Contiguous Scheduled BW | Frequency density |
| --- | --- |
| $N_{RB}$ < $N_{RB0}$ | k |
| $N_{RB0}$ < $N_{RB}$ < $N_{RB1}$ | 2 |
| $N_{RB1}$ < $N_{RB}$ | 4 |

In this case, the high Doppler configuration may index into the table or explicitly specify the frequency density (e.g., may identify an index, included in the table, associated with the frequency density). $N_{RB}$ may correspond to the system bandwidth of the BS (e.g., in a quantity of resource blocks (RBs)) and $N_{RB0}$ and $N_{RB1}$ may correspond to different bandwidth thresholds. In some aspects, k may be a configurable value such that, if $N_{RB}$<$N_{RB0}$, the BS may transmit a PTRS across k RBs. Example values for k may include 1, 2, and/or the like.

In some aspects, the BS may determine the time density and/or frequency density for the high Doppler configuration based at least in part on other factors, such as a satellite type of the BS. In this case, the BS may determine the time density and/or frequency density for the high Doppler configuration based at least in part on a mapping (e.g., specified in a table, in a specification, in a database, and/or the like) between satellite types and sets of time density and/or frequency density parameters. As an example, an LEO satellite type may be associated with a first set of time density and/or frequency density parameters, an MEO satellite type may be associated with a second set of time density and/or frequency density parameters, a GEO satellite type may be associated with a third set of time density and/or frequency density parameters, and/or the like. In some aspects, since the speed of travel of satellites may decrease as the distance of the orbit of the satellite from the Earth increases, and since the coverage area provided by the satellite may increase as the distance of the orbit of the satellite from the Earth increases, the magnitude of Doppler shift may decrease as the distance of the orbit of the satellite from the Earth increases. Accordingly, the time density and/or frequency density of the PTRS may be higher or greater for LEO satellites relative to MEO satellites and GEO satellites, the time density and/or frequency density of the PTRS may be higher or greater for MEO satellites relative to GEO satellites, and/or the like.

In some aspects, the one or more PTRS parameters may include a parameter that indicates and/or specifies whether the BS is to use the same time density and/or frequency density for PTRSs that are transmitted for paging RMSI communications. In some aspects, the one or more PTRS parameters may include a parameter that indicates and/or specifies whether a scrambling identifier is to be used to scramble a PTRS, and/or a type of scrambling identifier that is to be used to scramble the PTRS. The scrambling identifier may include, for example, a cell-specific identifier associated with the BS, a group-specific identifier associated with the UE (e.g., random access radio network temporary identifier (RA-RNTI), a group common radio network temporary identifier (GC-RNTI), and/or the like), and/or the like. In some aspects, one or more PTRS parameters may include a parameter that indicates and/or specifies a PTRS sequence mapping for a PTRS, a PTRS sequence modulation scheme for the PTRS, and/or the like. For example, the PTRS sequence mapping may include mapping a PTRS sequence (e.g., a Gold sequence, a Zadoff-Chu sequence, and/or the like) first and a time-domain resource second, may include mapping the time-domain resource first and the PTRS sequence second, and/or the like.

In some aspects, the high Doppler configuration may indicate, include, and/or specify a DMRS parameter for transmitting DMRSs for the one or more paging communications. The DMRS parameter may indicate and/or specify whether the BS is to transmit additional DMRSs (e.g., two additional DMRSs, three additional DMRSs, and/or the like) for the one or more paging communications, which may be used by UEs to further assist in channel estimation for the one or more paging communications.

In some aspects, the high Doppler configuration may indicate, include, and/or specify one or more sub-carrier spacing (SCS) parameters. For example, the one or more SCS parameters may indicate and/or specify an SCS for one or more PBCHs associated with the BS, an SCS for the one or more paging communications, and/or the like. In some aspects, the SCS for the one or more PBCHs and the SCS for the one or more paging communications may be the same SCS or different SCSs.

In some aspects, the high Doppler configuration may explicitly specify the one or more SCS parameters. For example, the high Doppler configuration may specify that an SCS of 60 kHz is to be used with sub-6-GHz frequencies, may specify that an SCS of 240 kHz is to be used with mmW frequencies, and/or the like. In some aspects, the high Doppler configuration may implicitly specify the one or more SCS parameters. For example, the high Doppler configuration may specify that the SCS of 60 kHz is to be used with sub-6-GHz frequencies, may specify that the highest SCS permitted to be used is configured for the high Doppler configuration to decrease the effects of high Doppler shift between the UE and the BS, and/or the like.

As further shown in FIG. 5A, and by reference number 504, the BS may transmit, to the UE, an indication of the high Doppler configuration for UE paging and an indication of whether the high Doppler configuration is activated. In some aspects, the BS may transmit the indication of the high Doppler configuration and/or the indication of whether the high Doppler configuration is activated in various types of communications. For example, the BS may transmit the indication of the high Doppler configuration in one or more system information communications, one or more PDCCH communications, one or more PDSCH communications, and/or the like. The one or more system information communications may include, for example, a PBCH communication, an RMSI communication, an OSI communication, an SSS transmission, and/or the like. The one or more PDCCH communications may include, for example, a control portion of a paging communication and/or the like. The one or more PDSCH communications may include, for example, an RMSI communication, an OSI communication, a radio resource control (RRC) communication, a downlink control information (DCI) communication, and/or the like.

In some aspects, if the BS transmits the indication of whether the high Doppler configuration is activated and/or the indication of the high Doppler configuration in one or more system information communications, the indication of whether the high Doppler configuration is activated and/or the indication of the high Doppler configuration may be included in one or more bits in a payload of a PBCH communication (e.g., one or more reserved bits), may correspond to a cell identifier associated with the BS and indicated in an SSS transmission (e.g., the cell identifier may be included in a group of cell identifiers that is associated with activated high Doppler configurations), and/or the like.

In some aspects, the BS may generate a plurality of candidate high Doppler configurations. In this case, the BS may transmit an indication of the plurality of high Doppler configurations and an indication of which high Doppler configuration is to be used. In this case, the BS may transmit an indication of the plurality of candidate high Doppler configurations in an RRC communication and may transmit an indication of the selected high Doppler configuration in a DCI communication. In this way, the BS is permitted to dynamically switch between different high Doppler configurations (e.g., for different threshold amounts of Doppler shift).

In some aspects, the payload of a PBCH communication may include a plurality of bits that are used to indicate whether the high Doppler configuration is activated and/or the high Doppler configuration is to be used. In this case, the plurality of bits may indicate which high Doppler configuration of the plurality of candidate high Doppler configurations is activated. As an example, the BS may configure two reserve bits (e.g., 00) to indicate that no high Doppler configuration is activated, may configure the two reserve bits (e.g., 01) to indicate that a first high Doppler configuration is activated (e.g., which may correspond to a high Doppler configuration associated with an LEO satellite type), may configure the two reserve bits (e.g., 10) to indicate that a second high Doppler configuration is activated (e.g., which may correspond to a high Doppler configuration associated with a MEO satellite type), and so on.

Additionally and/or alternatively, the BS may be configured with a plurality of candidate cell identifiers and/or cell identifier groups that the BS may use to indicate which high Doppler configuration of the plurality of candidate high Doppler configurations is activated. In this case, each candidate cell identifier or cell identifier group may be associated with a respective satellite type, and each satellite type may be associated with a respective candidate high Doppler configuration.

In some aspects, instead of the BS generating the high Doppler configuration (and/or the plurality of candidate high Doppler configurations), one or more network controllers included in the wireless network may generate the high Doppler configuration (and/or the plurality of candidate high Doppler configurations), such as an access and mobility management function (AMF) device, a policy control function (PCF) device, a session management function (SMF) device, and/or the like. In this case, the one or more network controllers may configure the BS to use the high Doppler configuration (and/or the plurality of candidate high Doppler configurations).

As shown in FIG. 5B, and by reference number 506, if a high Doppler configuration for UE paging is activated, the BS may transmit a PTRS for a paging communication according to the high Doppler configuration (e.g., according to the one or more PTRS parameters indicated and/or specified in the high Doppler configuration). Moreover, the BS may transmit PBCH communications, the PTRS, and/or the paging communication according to the one or more SCS parameters indicated and/or specified in the high Doppler configuration, may transmit one or more DMRSs, for the paging communication, according to the DMRS parameter indicated and/or specified in the high Doppler configuration, and/or the like.

As further shown in FIG. 5B, and by reference number 508, if the UE determines that a high Doppler configuration for UE paging is activated (e.g., based at least in part on receiving an indication that the high Doppler configuration is activated), the UE may detect a PTRS transmitted for a paging communication and may perform phase noise compensation for the paging communication based at least in part on the PTRS. For example, the UE may perform one or more phase tracking measurements based at least in part on the PTRS to determine an amount of phase noise on the satellite communication link, and may compensate for the phase noise when demodulating and/or decoding the paging communication. Moreover, the UE may detect, decode, and/or demodulate the PTRS and/or the paging communication based at least in part on the SCS indicated by the high Doppler configuration, based at least in part on the one or more additional DMRSs transmitted for the PTRS and/or the paging communication, and/or the like.

In this way, the BS (e.g., a non-stationary satellite in an NTN deployment) may configure one or more high Doppler configurations for UE paging, based at least in part on which the BS may transmit one or more PTRSs for paging communication that are transmitted by the BS in order to cause a UE to transition from an idle state or inactive state to an active state. Moreover, the BS may transmit an indication of whether a high Doppler configuration is activated, may transmit an indication of the high Doppler configuration (e.g., the one or more parameters for the high Doppler configuration), and/or the like. In this way, if a UE receives a paging communication, the UE may determine whether the UE is to use a high Doppler configuration for the paging communication, may identify the one or more parameters for the high Doppler configuration, and may use the one or more PTRSs transmitted from the BS to mitigate the effects of large Doppler shift due to the high relative speed between the BS and the UE. This improves demodulation performance for paging communications, which reduces latency, increases reliability, and improves network performance.

As indicated above, FIGS. 5A and 5B are provided as examples. Other examples may differ from what is described with respect to FIGS. 5A and 5B.

Figure 6A:
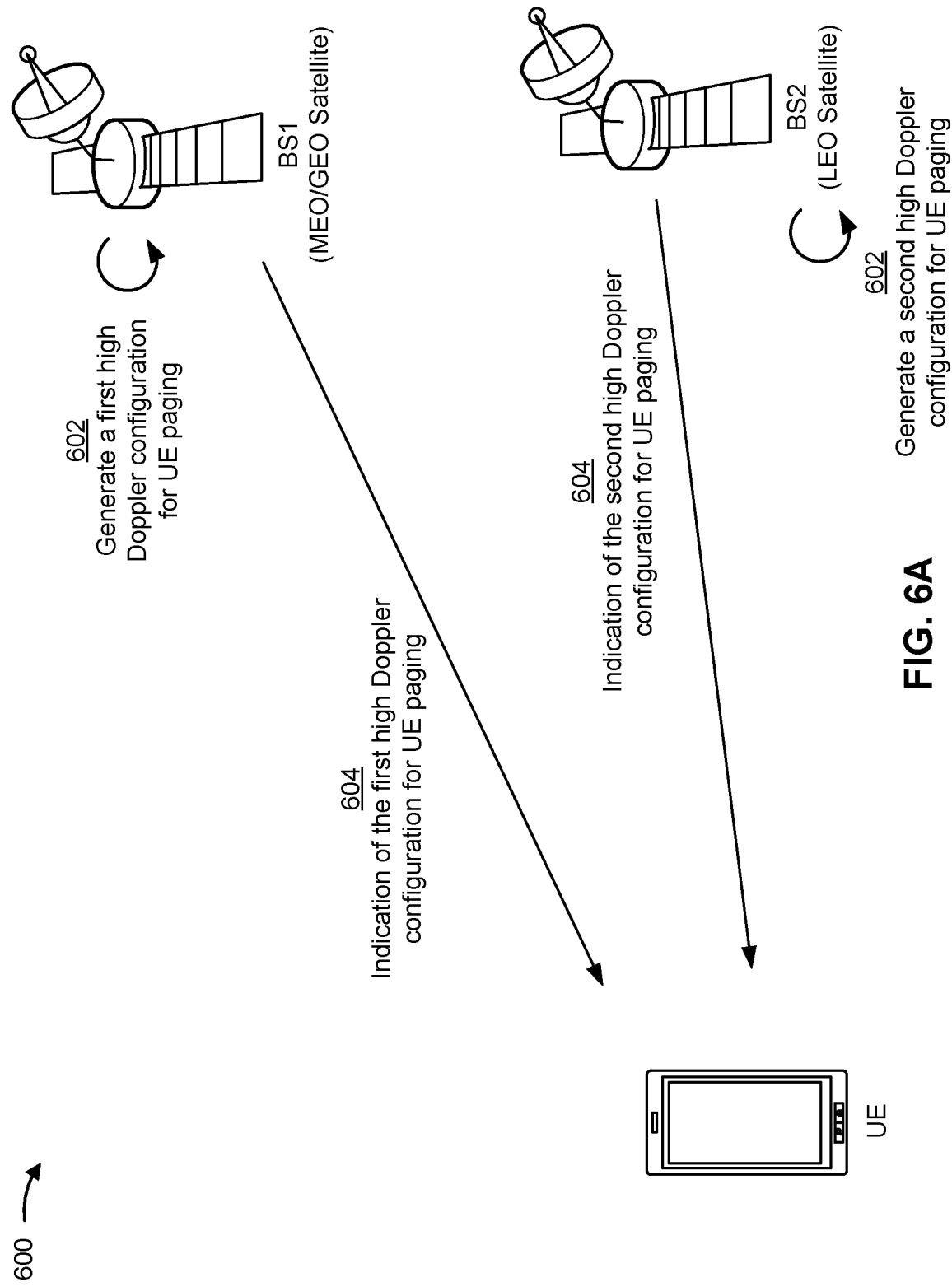
Figure 6B:
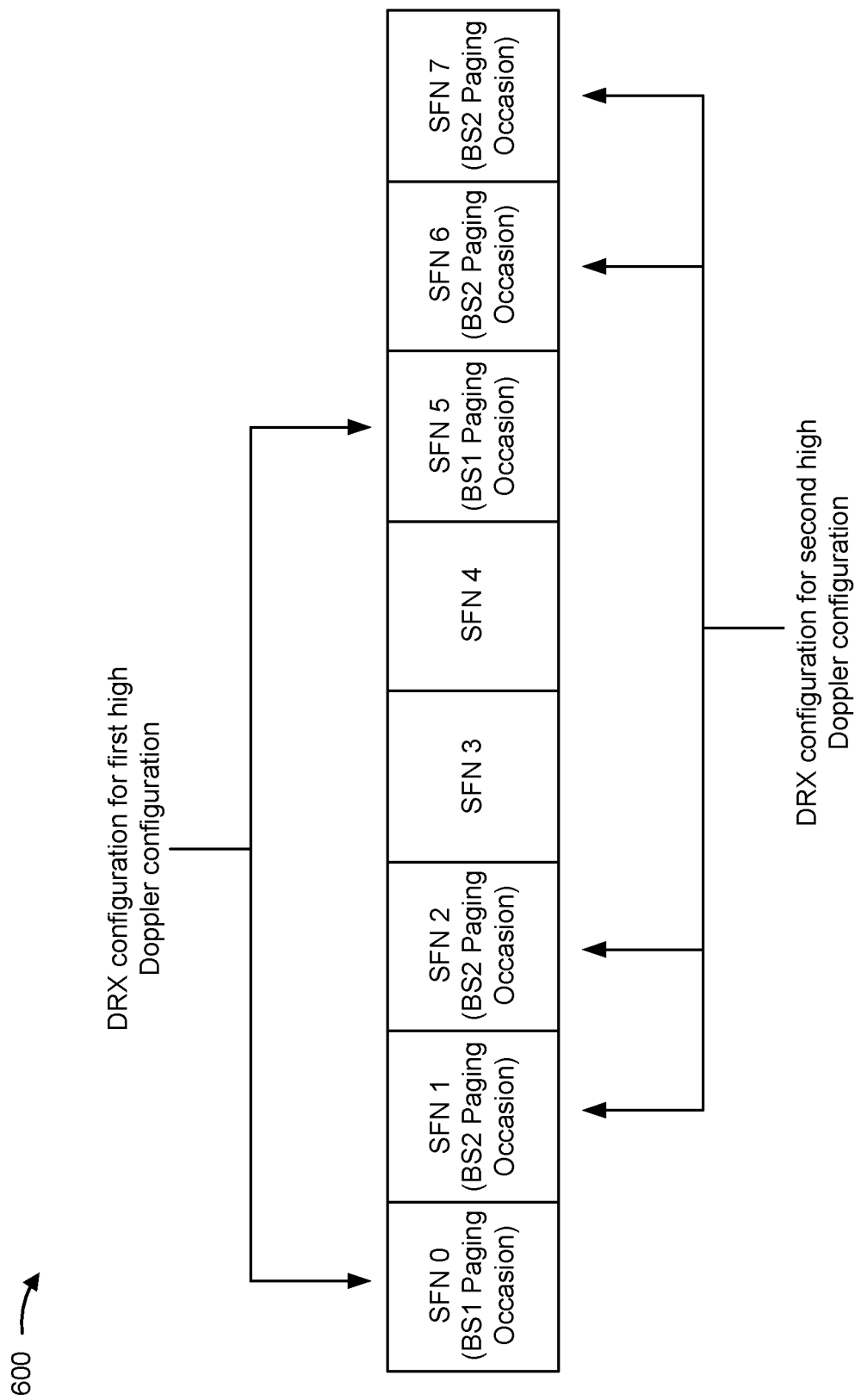
Figure 6C:
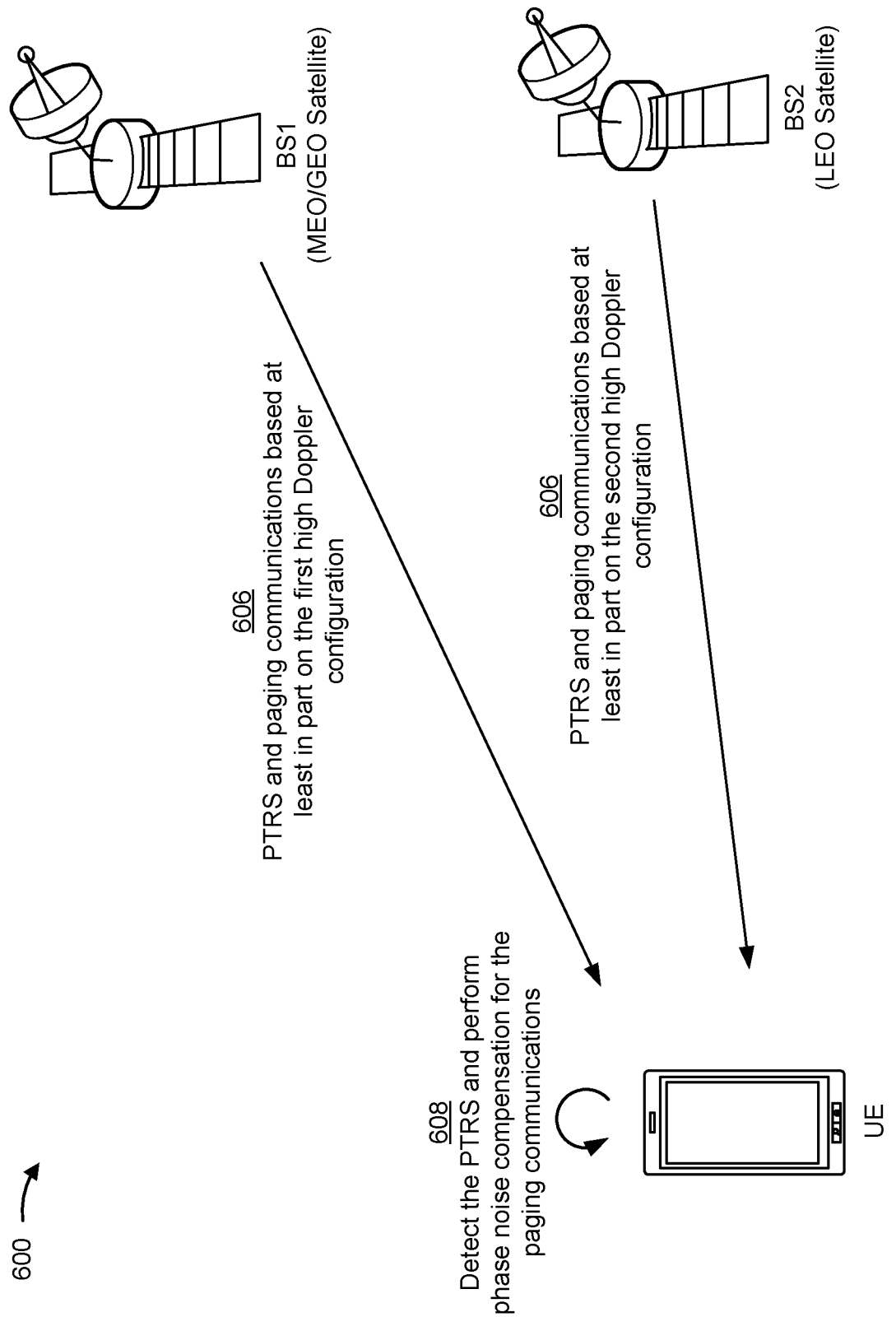

FIGS. 6A-6C are diagrams illustrating one or more examples 600 of phase tracking for UE paging, in accordance with various aspects of the present disclosure. As shown in FIG. 6, examples 600 may include communication between a UE (e.g., UE 120) and a plurality of BSs (e.g., BS 110), such as BS1, BS2, and/or the like. In some aspects, the BSs may be included in an NTN deployment of a wireless network (e.g., wireless network 100). In this case, the BSs may be implemented by non-stationary satellites that communicate directly with the UE via satellite communication links and/or other types of non-terrestrial communication links. In some aspects, the BSs and the UE may communicate using a frame structure, such as frame structure 300 illustrated in FIG. 3A and/or another frame structure.

In some aspects, BS1 and BS2 may be different satellite types. For example, BS1 may be an MEO or GEO satellite and BS2 may be an LEO satellite. In some aspects, BS1 and BS2 may be included in the same tracking area for purposes of UE paging. In this case, if a BS, one or more network controllers included in the wireless network, and/or the like are instructed to cause the UE to transition from an idle state or inactive state to an active state, the BS, the one or more network controllers, and/or the like may cause BS1 and/or BS2 to transmit paging communications to the UE if the UE is located in the tracking area.

In some aspects, the BS (e.g., BS1 and/or BS2) that is to transmit the paging communication to the UE may be based at least in part on an NTN capability of the UE. For example, the UE may be capable of communicating with MEO or GEO satellites (e.g., may be equipped with a sufficiently powerful antenna gain receiver to receive communications from MEO or GEO satellites) and/or may be capable of communicating with LEO satellites (e.g., may be equipped with a receiver that is capable of accommodating large Doppler and/or timing variations). If the UE is capable of communicating with MEO or GEO satellites but not LEO satellites, BS1 may be configured to transmit paging communications to the UE in the tracking area. If the UE is capable of communicating with LEO satellites but not MEO or GEO satellites, BS2 may be configured to transmit paging communications to the UE in the tracking area. If the UE is capable of communicating with LEO satellites and MEO or GEO satellites, BS1 and BS2 may both be configured to transmit paging communications to the UE in the tracking area.

Since the BSs may be non-stationary satellites that travel at a high speed relative to the UE, this high speed of travel may cause a high Doppler shift to occur between the BS and the UE, which in turn may cause phase noise (e.g., fast phase variations in time and/or frequency) to occur on the satellite communication link.

As shown in FIG. 6A, and by reference number 602, to compensate for and/or mitigate the effects of the high Doppler shift, BS1 and BS2 may each generate a high Doppler configuration for paging communications that are transmitted to cause the UE to transition from an idle state or inactive state to an active state. For example, BS1 may generate a first high Doppler configuration for UE paging and BS2 may generate a second high Doppler configuration for UE paging. The high Doppler configurations may configure, among other things, a PTRS for one or more paging communications that are typically not configured with a PTRS due to having a lower level MCS (e.g., quadrature phase shift keying (QPSK) and/or the like).

In some aspects, the high Doppler configurations may each indicate, include, and/or specify one or more parameters for the one or more paging communications. In some aspects, one or more of the parameters indicated by the first high Doppler configuration, and one or more of the parameters indicated by the second high Doppler configuration, may be configured the same or differently. In some aspects, the one or more parameters included in the first high Doppler configuration and the second high Doppler configuration may include any of the parameters described above in connection with FIGS. 5A and 5B, such as one or more PTRS parameters for transmitting one or more PTRSs for the one or more paging communications, one or more SCS parameters, one or more DMRS parameters, and/or the like. In some aspects, the configuration of the parameters included in the first high Doppler configuration and the second high Doppler configuration may be based at least in part on the satellite types of BS1 and BS2.

In some aspects, the first high Doppler configuration and the second high Doppler configuration may additionally include respective discontinuous reception (DRX) parameters that configure respective DRX configurations for the UE. In some aspects, the respective DRX parameters may be included in the high Doppler configurations based at least in part on a capability of the UE, which may be signaled to BS1 and BS2 by the UE. For example, if the UE is capable of communicating with LEO satellites and MEO or GEO satellites, BS1 and BS2 may both be configured to transmit paging communications to the UE in the tracking area. In this case, BS1 and BS2 (and/or one or more network controllers) may jointly coordinate and/or determine the respective DRX configurations for the UE such that paging transmissions from BS1 and BS2 are time and/or frequency staggered or separated. As an example, the DRX parameter of the first high Doppler configuration may specify that paging communications (and corresponding PTRSs) are transmitted by BS1 using a first set of subframes, and the DRX parameter of the second high Doppler configuration may specify that paging communications (and corresponding PTRSs) are transmitted by BSs using a second set of subframes. The first set of subframes and the second set of subframes may be at least partially or fully non-overlapping sets of subframes. In some aspects, if the UE is only capable of communicating with GEO satellites, the UE may be configured with a high Doppler configuration with a DRX parameter for paging communication with a GEO satellite. In some aspects, if the UE is only capable of communicating with MEO satellites, the UE may be configured with a high Doppler configuration with a DRX parameter for paging communication with an MEO satellite. In some aspects, if the UE is only capable of communicating with LEO satellites, the UE may be configured with a high Doppler configuration with a DRX parameter for paging communication with an LEO satellite.

As further shown in FIG. 6A, and by reference number 604, the BSs may transmit, to the UE, an indication of the high Doppler configurations for UE paging and an indication of whether the high Doppler configurations are activated. For example, BS1 may transmit an indication of the first high Doppler configuration and/or an indication of whether the first high Doppler configuration is activated, and BS2 may transmit an indication of the second high Doppler configuration and/or an indication of whether the second high Doppler configuration is activated. In some aspects, the BS may transmit the indication of the high Doppler configuration and/or the indication of whether the high Doppler configuration is activated in various types and/or combinations of communications, such as any of the types and/or combinations described above in connection with FIGS. 5A and 5B.

FIG. 6B illustrates example DRX configurations for the first high Doppler configuration and the second high Doppler configuration. As shown in FIG. 6B, the DRX configuration for the first high Doppler configuration may configure one or more subframes (e.g., subframe number (SFN) 0 and SFN 5) in which BS1 may transmit paging communications and corresponding PTRSs, and the DRX configuration for the second high Doppler configuration may configure one or more subframes (e.g., SFN 1, SFN 2, SFN 6, and SFN 7) in which BS2 may transmit paging communications and corresponding PTRSs. Each subframe may include one or more paging occasions, which include time-domain and/or frequency-domain resources in which paging communications may be transmitted.

As shown in FIG. 6B, the set of subframes configured by the first high Doppler configuration and the set of subframes configured by the second high Doppler configuration may be non-overlapping sets of subframes. In this way, the first high Doppler configuration and the second high Doppler configuration may have staggered paging time distributions. Accordingly, the UE may monitor the paging occasions configured by the DRX configuration for the first high Doppler configuration for paging communications transmitted from BS1, and may monitor the paging occasions configured by the DRX configuration for the second high Doppler configuration for paging communications transmitted from BS2.

As shown in FIG. 6C, and by reference number 606, if the first high Doppler configuration for UE paging is activated, BS1 may transmit a PTRS for a paging communication according to the first high Doppler configuration (e.g., according to the one or more PTRS parameters indicated and/or specified in the first high Doppler configuration). Moreover, BS1 may transmit PBCH communications, the PTRS, and/or the paging communication according to the one or more SCS parameters and/or DRX parameters indicated and/or specified in the first high Doppler configuration, may transmit one or more DMRSs, for the paging communication, according to the DMRS parameter indicated and/or specified in the first high Doppler configuration, and/or the like.

Similarly, if the second high Doppler configuration for UE paging is activated, BS2 may transmit a PTRS for a paging communication according to the second high Doppler configuration (e.g., according to the one or more PTRS parameters indicated and/or specified in the second high Doppler configuration). Moreover, BS2 may transmit PBCH communications, the PTRS, and/or the paging communication according to the one or more SCS parameters and/or DRX parameters indicated and/or specified in the second high Doppler configuration, may transmit one or more DMRSs, for the paging communication, according to the DMRS parameter indicated and/or specified in the second high Doppler configuration, and/or the like.

As further shown in FIG. 6C, and by reference number 608, if the UE determines that the first high Doppler configuration for UE paging is activated (e.g., based at least in part on receiving an indication that the first high Doppler configuration is activated), the UE may detect a PTRS transmitted for a paging communication transmitted from BS1, and may perform phase noise compensation for the paging communication based at least in part on the PTRS. If the UE determines that the second high Doppler configuration for UE paging is activated (e.g., based at least in part on receiving an indication that the second high Doppler configuration is activated), the UE may detect a PTRS transmitted for a paging communication transmitted from BS2, and may perform phase noise compensation for the paging communication based at least in part on the PTRS. For example, the UE may perform one or more phase tracking measurements based at least in part on the PTRSs to determine an amount of phase noise on the satellite communication link, and may compensate for the phase noise when demodulating and/or decoding the paging communication. Moreover, the UE may detect, decode, and/or demodulate the PTRSs and/or the paging communications based at least in part on the SCS indicated by the first high Doppler configuration and/or the second high Doppler configuration, based at least in part on the one or more additional DMRSs transmitted for the PTRSs and/or the paging communications, and/or the like.

In this way, the BSs (e.g., a non-stationary satellite in an NTN deployment) may (e.g., jointly) configure one or more high Doppler configurations for UE paging, based at least in part on which the BSs may transmit one or more PTRSs for paging communication that are transmitted by the BSs in order to cause a UE to transition from an idle state or inactive state to an active state. Moreover, the BSs may transmit an indication of whether an associated high Doppler configuration is activated, may transmit an indication of the associated high Doppler configuration (e.g., the one or more parameters for the associated high Doppler configuration), and/or the like. In this way, if a UE receives a paging communication, the UE may determine whether the UE is to use a high Doppler configuration for the paging communication, may identify the one or more parameters for the high Doppler configuration, and may use the one or more PTRSs transmitted from the BSs to mitigate the effects of large Doppler shift due to the high relative speed between the BSs and the UE. This improves demodulation performance for paging communications, which reduces latency, increases reliability, and improves network performance.

As indicated above, FIGS. 6A-6C are provided as examples. Other examples may differ from what is described with respect to FIGS. 6A-6C.

Figure 7:
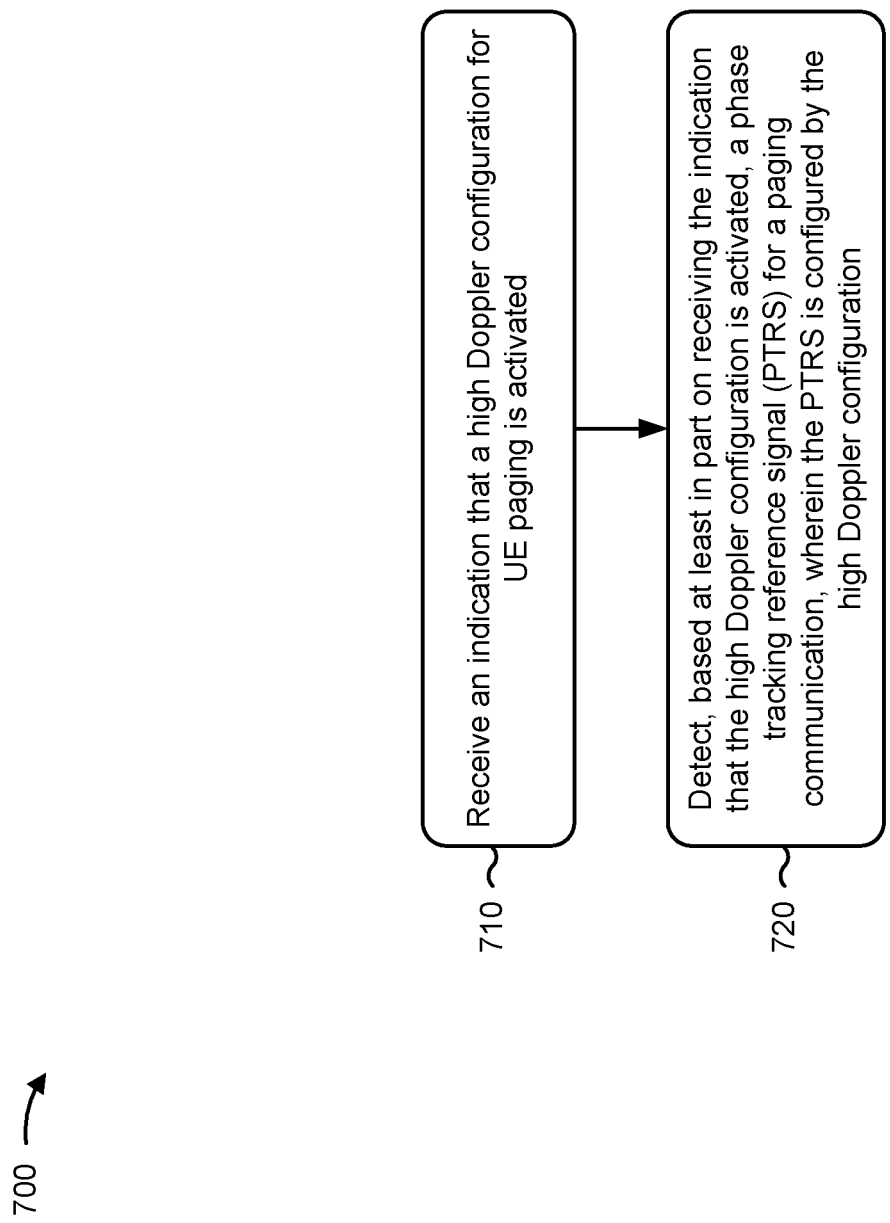
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs operations associated with phase tracking for UE paging.

As shown in FIG. 7, in some aspects, process 700 may include receiving an indication that a high Doppler configuration for UE paging is activated (block 710). For example, the UE (e.g., using receive processor 258, transmit processor 264, controller/processor 280, memory 282, and/or the like) may receive an indication that a high Doppler configuration for UE paging is activated, as described above.

As further shown in FIG. 7, in some aspects, process 700 may include detecting, based at least in part on receiving the indication that the high Doppler configuration is activated, a PTRS for a paging communication, wherein the PTRS is configured by the high Doppler configuration (block 720). For example, the UE (e.g., using receive processor 258, transmit processor 264, controller/processor 280, memory 282, and/or the like) may detect, based at least in part on receiving the indication that the high Doppler configuration is activated, a PTRS for a paging communication. In some aspects, the PTRS is configured by the high Doppler configuration.

Process 700 may include additional aspects, such as any single aspect or any combination of aspects described below and/or in connection with one or more other processes described elsewhere herein.

In a first aspect, receiving the indication that the high Doppler configuration is activated comprises receiving the indication that the high Doppler configuration is activated in a system information communication, wherein the system information communication comprises at least one of a PBCH communication, an RMSI communication, or an OSI communication. In a second aspect, alone or in combination with the first aspect, receiving the indication that the high Doppler configuration is activated comprises receiving the indication that the high Doppler configuration is activated in at least one of a PDCCH communication, a DCI communication, or an RRC communication.

In a third aspect, alone or in combination with one or more of the first and second aspects, the high Doppler configuration includes one or more PTRS parameters for the PTRS, and the one or more PTRS parameters comprise at least one of a parameter that indicates that the PTRS is to be transmitted for the paging communication, a parameter that indicates that one or more additional DMRSs are to be transmitted for the paging communication, a parameter that indicates a SCS for the PTRS, a parameter that indicates a time density for the PTRS, a parameter that indicates a frequency density for the PTRS, a parameter that indicates a scrambling identifier for the PTRS, a parameter that indicates a PTRS sequence mapping for the PTRS, a parameter that indicates a PTRS sequence initial phase for the PTRS, or a parameter that indicates a PTRS sequence modulation scheme for the PTRS.

In a fourth aspect, alone or in combination with one or more of the first through third aspects, the SCS for the PTRS, indicated in the high Doppler configuration, is a greatest SCS configurable for a frequency range associated with a base station. In a fifth aspect, alone or in combination with one or more of the first through fourth aspects, the parameter that indicates the time density for the PTRS and the parameter that indicates the frequency density for the PTRS identify an index included in one or more PTRS density tables. In a sixth aspect, alone or in combination with one or more of the first through fifth aspects, the parameter that indicates the time density for the PTRS specifies that the PTRS is to be transmitted on all PDSCH symbols associated with a BS or a subset of the PDSCH symbols associated with the BS.

In a seventh aspect, alone or in combination with one or more of the first through sixth aspects, the scrambling identifier for the PTRS comprises a cell-specific identifier or a group-specific identifier. In an eighth aspect, alone or in combination with one or more of the first through seventh aspects, the indication that the high Doppler configuration is activated is included in one or more bits of a PBCH. In a ninth aspect, alone or in combination with one or more of the first through eighth aspects, the indication that the high Doppler configuration is activated, and an indication of one or more parameters for the high Doppler configuration, are included in one or more bits of a PBCH.

In a tenth aspect, alone or in combination with one or more of the first through ninth aspects, the high Doppler configuration is included in a plurality of candidate high Doppler configurations, and process 700 further comprises receiving an indication of the plurality of candidate high Doppler configurations in a radio resource control communication, and receiving the indication that the high Doppler configuration is activated comprises receiving the indication that the high Doppler configuration is activated in a downlink control information (DCI) communication. In an eleventh aspect, alone or in combination with one or more of the first through tenth aspects, process 700 further comprises receiving an indication of the high Doppler configuration in a DCI communication, and the high Doppler configuration indicated in the DCI communication overrides another high Doppler configuration indicated in a radio resource control communication.

In a twelfth aspect, alone or in combination with one or more of the first through eleventh aspects, one or more parameters included in the high Doppler configuration correspond to one or more parameters included in another high Doppler configuration associated with at least one of an RMSI communication associated with a base station or an OSI communication associated with the BS. In a thirteenth aspect, alone or in combination with one or more of the first through twelfth aspects, the high Doppler configuration is associated with a BS, the BS comprises a satellite BS, and the high Doppler configuration is based at least in part on a satellite type of the BS. In a fourteenth aspect, alone or in combination with one or more of the first through thirteenth aspects, the BS comprises an LEO satellite, an MEO satellite, or a GEO satellite. In a fifteenth aspect, alone or in combination with one or more of the first through fourteenth aspects, the high Doppler configuration is included in a plurality of candidate high Doppler configurations for a tracking area, and each candidate high Doppler configuration, of the plurality of candidate high Doppler configurations, is associated with a respective satellite type.

In a sixteenth aspect, alone or in combination with one or more of the first through fifteenth aspects, the high Doppler configuration is included in a plurality of candidate high Doppler configurations for a tracking area, and each candidate high Doppler configuration, of the plurality of candidate high Doppler configurations, is associated with respective sets of time density and frequency density parameters for the PTRS. In a seventeenth aspect, alone or in combination with one or more of the first through sixteenth aspects, the high Doppler configuration is included in a plurality of candidate high Doppler configurations for a tracking area, and the plurality of candidate high Doppler configurations comprise at least one of a first candidate high Doppler configuration associated with an LEO satellite type, a second candidate high Doppler configuration associated with an MEO satellite type, or a third candidate high Doppler configuration associated with a GEO satellite type.

In an eighteenth aspect, alone or in combination with one or more of the first through seventeenth aspects, at least one of a time density or a frequency density associated with the second candidate high Doppler configuration is lower relative to at least one of a time density or a frequency density associated with the first candidate high Doppler configuration, and at least one of a time density or a frequency density associated with the third candidate high Doppler configuration is lower relative to at least one of a time density or a frequency density associated with the second candidate high Doppler configuration. In a nineteenth aspect, alone or in combination with one or more of the first through eighteenth aspects, the high Doppler configuration is associated with a first BS, and process 700 further comprises receiving an indication that another high Doppler configuration for UE paging, associated with a second BS, is activated, the first BS and the second BS being associated with different satellite types, and detecting, based at least in part on receiving the indication that the other high Doppler configuration is activated, another PTRS for another paging communication transmitted from the second BS, the other PTRS being configured by the other high Doppler configuration.

In a twentieth aspect, alone or in combination with one or more of the first through nineteenth aspects, the high Doppler configuration includes a first DRX parameter that indicates a first set of subframes for UE paging, the other high Doppler configuration includes a second DRX parameter that indicates a second set of subframes for UE paging, and the first set of subframes and the second set of subframes are non-overlapping sets of subframes. In a twenty-first aspect, alone or in combination with one or more of the first through twentieth aspects, the first DRX parameter is included in the high Doppler configuration and the second DRX parameter is included in the other high Doppler configuration based at least in part on a capability of the UE. In a twenty-second aspect, alone or in combination with one or more of the first through twenty-first aspects, the high Doppler configuration is included in a plurality of candidate high Doppler configurations for a tracking area, and each candidate high Doppler configuration, of the plurality of candidate high Doppler configurations, is associated with respective paging time distributions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a BS, in accordance with various aspects of the present disclosure. Example process 800 is an example where a BS (e.g., BS 110) performs operations associated with phase tracking for UE paging.

As shown in FIG. 8, in some aspects, process 800 may include transmitting an indication that a high Doppler configuration for UE paging is activated (block 810). For example, the BS (e.g., using transmit processor 220, receive processor 238, controller/processor 240, memory 242, and/or the like) may transmit an indication that a high Doppler configuration for UE paging is activated, as described above.

As further shown in FIG. 8, in some aspects, process 800 may include transmitting a PTRS, configured by the high Doppler configuration, for a paging communication (block 820). For example, the BS (e.g., using transmit processor 220, receive processor 238, controller/processor 240, memory 242, and/or the like) may transmit a PTRS, configured by the high Doppler configuration, for a paging communication, as described above.

Process 800 may include additional aspects, such as any single aspect or any combination of aspects described below and/or in connection with one or more other processes described elsewhere herein.

In a first aspect, transmitting the indication that the high Doppler configuration is activated comprises transmitting the indication that the high Doppler configuration is activated, and an indication of the high Doppler configuration, in a system information communication, and the system information communication comprises at least one of a PBCH communication, an RMSI communication, or an OSI communication. In a second aspect, alone or in combination with the first aspect, transmitting the indication that the high Doppler configuration is activated comprises transmitting the indication that the high Doppler configuration is activated, and an indication of the high Doppler configuration, in at least one of a PDCCH communication, a DCI communication, or an RRC communication.

In a third aspect, alone or in combination with one or more of the first and second aspects, the high Doppler configuration includes one or more PTRS parameters for the PTRS, and the one or more PTRS parameters comprise at least one of a parameter that indicates that the PTRS is to be transmitted for the paging communication, a parameter that indicates that one or more additional DMRSs are to be transmitted for the paging communication, a parameter that indicates an SCS for the PTRS, a parameter that indicates a time density for the PTRS, a parameter that indicates a frequency density for the PTRS, a parameter that indicates a scrambling identifier for the PTRS, a parameter that indicates a PTRS sequence mapping for the PTRS, a parameter that indicates a PTRS sequence initial phase for the PTRS, or a parameter that indicates a PTRS sequence modulation scheme for the PTRS. In a fourth aspect, alone or in combination with one or more of the first through third aspects, the SCS for the PTRS, indicated in the high Doppler configuration, is a greatest SCS configurable for a frequency range associated with a base station.

In a fifth aspect, alone or in combination with one or more of the first through fourth aspects, the parameter that indicates the time density for the PTRS and the parameter that indicates the frequency density for the PTRS identify an index included in one or more PTRS density tables. In a sixth aspect, alone or in combination with one or more of the first through fifth aspects, the parameter that indicates the time density for the PTRS specifies that the PTRS is to be transmitted on all PDSCH symbols associated with a BS, or a subset of the PDSCH symbols associated with the BS. In a seventh aspect, alone or in combination with one or more of the first through sixth aspects, the scrambling identifier for the PTRS comprises a cell-specific identifier or a group-specific identifier. In an eighth aspect, alone or in combination with one or more of the first through seventh aspects, the indication that the high Doppler configuration is activated is included in one or more bits of a PBCH.

In a ninth aspect, alone or in combination with one or more of the first through eighth aspects, the indication that the high Doppler configuration is activated, and an indication of one or more parameters for the high Doppler configuration, are included in one or more bits of a PBCH. In a tenth aspect, alone or in combination with one or more of the first through ninth aspects, the high Doppler configuration is included in a plurality of candidate high Doppler configurations, and process 800 further comprises transmitting an indication of the plurality of candidate high Doppler configurations in a radio resource control communication, and transmitting the indication that the high Doppler configuration is activated comprises transmitting the indication that the high Doppler configuration is activated in a DCI communication.

In an eleventh aspect, alone or in combination with one or more of the first through tenth aspects, process 800 further comprises transmitting an indication of the high Doppler configuration in a DCI communication, and the high Doppler configuration indicated in the DCI communication overrides another high Doppler configuration received in a radio resource control communication. In a twelfth aspect, alone or in combination with one or more of the first through eleventh aspects, one or more parameters included in the high Doppler configuration correspond to one or more parameters included in another high Doppler configuration associated with at least one of an RMSI communication associated with a BS, or an OSI communication associated with the BS. In a thirteenth aspect, alone or in combination with one or more of the first through twelfth aspects, the BS comprises a satellite BS, and the high Doppler configuration is based at least in part on a satellite type of the BS.

In a fourteenth aspect, alone or in combination with one or more of the first through thirteenth aspects, the BS comprises an LEO satellite, an MEO satellite, or a GEO satellite. In a fifteenth aspect, alone or in combination with one or more of the first through fourteenth aspects, the high Doppler configuration is included in a plurality of candidate high Doppler configurations for a tracking area, and each candidate high Doppler configuration, of the plurality of candidate high Doppler configurations, is associated with a respective satellite type. In a sixteenth aspect, alone or in combination with one or more of the first through fifteenth aspects, the high Doppler configuration is included in a plurality of candidate high Doppler configurations for a tracking area, and each candidate high Doppler configuration, of the plurality of candidate high Doppler configurations, is associated with respective sets of time density and frequency density parameters for the PTRS.

In a seventeenth aspect, alone or in combination with one or more of the first through sixteenth aspects, the high Doppler configuration is included in a plurality of candidate high Doppler configurations for a tracking area, and the plurality of candidate high Doppler configurations comprise a first candidate high Doppler configuration associated with an LEO satellite type, a second candidate high Doppler configuration associated with an MEO satellite type, and a third candidate high Doppler configuration associated with a GEO satellite type. In an eighteenth aspect, alone or in combination with one or more of the first through seventeenth aspects, at least one of a time density or a frequency density associated with the second candidate high Doppler configuration is lower relative to at least one of a time density or a frequency density associated with the first candidate high Doppler configuration, and at least one of a time density or a frequency density associated with the third candidate high Doppler configuration is lower relative to at least one of a time density or a frequency density associated with the second candidate high Doppler configuration.

In a nineteenth aspect, alone or in combination with one or more of the first through eighteenth aspects, the high Doppler configuration includes a first DRX parameter that indicates a first set of subframes for UE paging, and another high Doppler configuration, included in the plurality of candidate high Doppler configurations associated with another BS, includes a second DRX parameter that indicates a second set of subframes for UE paging. In some aspects, the first set of subframes and the second set of subframes are non-overlapping sets of subframes. In a twentieth aspect, alone or in combination with one or more of the first through nineteenth aspects, process 800 further comprises jointly configuring, with the second BS, the first set of subframes and the second set of subframes. In a twenty-first aspect, alone or in combination with one or more of the first through twentieth aspects, process 800 further comprises configuring the high Doppler configuration for the BS.

In a twenty-second aspect, alone or in combination with one or more of the first through twenty-first aspects, the first DRX parameter is included in the high Doppler configuration and the second DRX parameter is included in the other high Doppler configuration based at least in part on a capability of the UE. In a twenty-third aspect, alone or in combination with one or more of the first through twenty-second aspects, the high Doppler configuration is included in a plurality of candidate high Doppler configurations for a tracking area, and each candidate high Doppler configuration, of the plurality of candidate high Doppler configurations, is associated with respective paging time distributions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a user equipment (UE), comprising:
   receiving an indication that a high Doppler configuration for UE paging is activated; and
   detecting, based at least in part on receiving the indication that the high Doppler configuration is activated, a phase tracking reference signal (PTRS),
      wherein the PTRS is configured by the high Doppler configuration.

2. The method of claim 1 wherein receiving the indication that the high Doppler configuration is activated comprises:
   receiving the indication that the high Doppler configuration is activated in at least one of:
      a physical downlink control channel communication,
      a downlink control information communication,
      a radio resource control communication,
      a physical broadcast channel communication,
      a remaining minimum system information communication, or
      an other system information communication.

3. The method of claim 1, wherein the high Doppler configuration includes one or more PTRS parameters for the PTRS,
   wherein the one or more PTRS parameters comprise at least one of:
      a parameter that indicates that the PTRS is to be transmitted,
      a parameter that indicates that one or more additional demodulation reference signals (DMRSs) are to be transmitted,
      a parameter that indicates a sub-carrier spacing (SCS) for the PTRS,
      a parameter that indicates a time density for the PTRS,
      a parameter that indicates a frequency density for the PTRS,
      a parameter that indicates a scrambling identifier for the PTRS,
      a parameter that indicates a PTRS sequence mapping for the PTRS,
      a parameter that indicates a PTRS sequence initial phase for the PTRS,
   or
      a parameter that indicates a PTRS sequence modulation scheme for the PTRS.

4. The method of claim 3, wherein the SCS for the PTRS, indicated in the high Doppler configuration, is a greatest SCS configurable for a frequency range associated with a base station.

5. The method of claim 4, wherein the parameter that indicates the time density for the PTRS specifies that the PTRS is to be transmitted on:
   all physical downlink shared channel (PDSCH) symbols associated with a base station (BS), or
   a subset of the PDSCH symbols associated with the BS.

6. The method of claim 4, wherein the scrambling identifier for the PTRS comprises:
   a cell-specific identifier, or
   a group-specific identifier.

7. The method of claim 1, wherein the high Doppler configuration is included in a plurality of candidate high Doppler configurations;
   wherein the method further comprises:
      receiving an indication of the plurality of candidate high Doppler configurations in a radio resource control communication; and
   wherein receiving the indication that the high Doppler configuration is activated comprises:
      receiving the indication that the high Doppler configuration is activated in a downlink control information communication.

8. The method of claim 1, further comprising:
   receiving an indication of the high Doppler configuration in a downlink control information (DCI) communication,
   wherein the high Doppler configuration indicated in the DCI communication overrides another high Doppler configuration indicated in a radio resource control communication.

9. The method of claim 1, wherein one or more parameters included in the high Doppler configuration correspond to one or more parameters included in another high Doppler configuration associated with at least one of:
   a remaining minimum system information communication associated with a base station, or
   an other system information communication associated with the BS.

10. A user equipment (UE), comprising:
   a receiver;
   at least one memory; and
   one or more processors operatively coupled to the at least one memory, the at least one memory and the one or more processors configured to:
      receive, via the receiver, an indication that a high Doppler configuration for UE paging is activated; and
      detect, based at least in part on receiving the indication that the high Doppler configuration is activated, a phase tracking reference signal (PTRS) for a paging communication,
         wherein the PTRS is configured by the high Doppler configuration.

11. The UE of claim 10, wherein the high Doppler configuration is based at least in part on a satellite type of the BS;
   wherein the high Doppler configuration is included in a plurality of candidate high Doppler configurations for a tracking area; and
   wherein each candidate high Doppler configuration, of the plurality of candidate high Doppler configurations, is associated with a respective satellite type.

12. The UE of claim 10, wherein the high Doppler configuration is included in a plurality of candidate high Doppler configurations for a tracking area; and
   wherein each candidate high Doppler configuration, of the plurality of candidate high Doppler configurations, is associated with respective sets of time density and frequency density parameters for the PTRS.

13. The UE of claim 10, wherein the high Doppler configuration is included in a plurality of candidate high Doppler configurations for a tracking area; and
   wherein each candidate high Doppler configuration, of the plurality of candidate high Doppler configurations, is associated with respective paging time distributions.

14. The UE of claim 10, wherein the high Doppler configuration is based at least in part on a satellite type of the BS;
   wherein the high Doppler configuration is included in a plurality of candidate high Doppler configurations for a tracking area; and
   wherein the plurality of candidate high Doppler configurations comprise at least one of:
      a first candidate high Doppler configuration associated with a low Earth orbit satellite type,
      a second candidate high Doppler configuration associated with a medium Earth orbit satellite type, or
      a third candidate high Doppler configuration associated with a geostationary equatorial orbit satellite type.

15. The UE of claim 14, wherein at least one of a time density or a frequency density associated with the second candidate high Doppler configuration is lower relative to at least one of a time density or a frequency density associated with the first candidate high Doppler configuration; and
   wherein at least one of a time density or a frequency density associated with the third candidate high Doppler configuration is lower relative to at least one of a time density or a frequency density associated with the second candidate high Doppler configuration.

16. The UE of claim 10, wherein the high Doppler configuration is associated with a first base station (BS); and
   wherein the one or more processors are further configured to:
      receive an indication that another high Doppler configuration for UE paging, associated with a second BS, is activated,
         wherein the first BS and the second BS are associated with different satellite types; and
      detect, based at least in part on receiving the indication that the other high Doppler configuration is activated, another PTRS for another paging communication transmitted from the second BS,
         wherein the other PTRS is configured by the other high Doppler configuration.

17. The UE of claim 16, wherein the high Doppler configuration includes a first discontinuous reception (DRX) parameter that indicates a first set of subframes for UE paging;
   wherein the other high Doppler configuration includes a second DRX parameter that indicates a second set of subframes for UE paging; and
   wherein the first set of subframes and the second set of subframes are non-overlapping sets of subframes.

18. A method of wireless communication performed by at a base station (BS), comprising:
   transmitting an indication that a high Doppler configuration for user equipment (UE) paging is activated; and
   transmitting a phase tracking reference signal (PTRS), configured by the high Doppler configuration.

19. The method of claim 18 wherein transmitting the indication that the high Doppler configuration is activated comprises:
   transmitting the indication that the high Doppler configuration is activated, and an indication of the high Doppler configuration, in at least one of:
      a physical downlink control channel communication,
      a downlink control information communication,
      a radio resource control communication,
      a physical broadcast channel communication,
      a remaining minimum system information communication, or
      an other system information communication.

20. The method of claim 18, wherein the high Doppler configuration includes one or more PTRS parameters for the PTRS,
   wherein the one or more PTRS parameters comprise at least one of:
      a parameter that indicates that the PTRS is to be transmitted,
      a parameter that indicates that one or more additional demodulation reference signals (DMRSs) are to be transmitted,
      a parameter that indicates a sub-carrier spacing (SCS) for the PTRS,
      a parameter that indicates a time density for the PTRS,
      a parameter that indicates a frequency density for the PTRS,
      a parameter that indicates a scrambling identifier for the PTRS,
      a parameter that indicates a PTRS sequence mapping for the PTRS,
      a parameter that indicates a PTRS sequence initial phase for the PTRS, or
      a parameter that indicates a PTRS sequence modulation scheme for the PTRS.

21. The method of claim 20, wherein the parameter that indicates the time density for the PTRS specifies that the PTRS is to be transmitted on:
   all physical downlink shared channel (PDSCH) symbol associated with a base station (BS), or
   a subset of the PDSCH symbols associated with the BS.

22. The method of claim 20, wherein the scrambling identifier for the PTRS comprises:
   a cell-specific identifier, or
   a group-specific identifier.

23. The method of claim 18, wherein the high Doppler configuration is included in a plurality of candidate high Doppler configurations;
   wherein the method further comprises:
      transmitting an indication of the plurality of candidate high Doppler configurations in a radio resource control communication; and
   wherein transmitting the indication that the high Doppler configuration is activated comprises:
      transmitting the indication that the high Doppler configuration is activated in a downlink control information communication.

24. The method of claim 18, further comprising:
   transmitting an indication of the high Doppler configuration in a downlink control information (DCI) communication,
      wherein the high Doppler configuration indicated in the DCI communication overrides another high Doppler configuration received in a radio resource control communication.

25. A base station (BS), comprising:
a transmitter;
at least one memory; and
one or more processors operatively coupled to the at least one memory, the at least one memory and the one or more processors configured to cause the base station to:
   transmit, via the transmitter, an indication that a high Doppler configuration for user equipment (UE) paging is activated; and
   transmit, via the transmitter, a phase tracking reference signal (PTRS), configured by the high Doppler configuration.

26. The BS of claim 25, wherein the high Doppler configuration is based at least in part on a satellite type of the BS;
   wherein the high Doppler configuration is included in a plurality of candidate high Doppler configurations for a tracking area; and
   wherein each candidate high Doppler configuration, of the plurality of candidate high Doppler configurations, is associated with a respective satellite type.

27. The BS of claim 25, wherein the high Doppler configuration is included in a plurality of candidate high Doppler configurations for a tracking area; and
   wherein each candidate high Doppler configuration, of the plurality of candidate high Doppler configurations, is associated with respective sets of time density and frequency density parameters for the PTRS.

28. The BS of claim 25, wherein the high Doppler configuration is included in a plurality of candidate high Doppler configurations for a tracking area; and
   wherein each candidate high Doppler configuration, of the plurality of candidate high Doppler configurations, is associated with respective paging time distributions.

29. The BS of claim 25, wherein the high Doppler configuration is based at least in part on a satellite type of the BS;
   wherein the high Doppler configuration is included in a plurality of candidate high Doppler configurations for a tracking area; and
   wherein the plurality of candidate high Doppler configurations comprise:
      a first candidate high Doppler configuration associated with a low Earth orbit satellite type,
      a second candidate high Doppler configuration associated with a medium Earth orbit satellite type, and
      a third candidate high Doppler configuration associated with a geostationary equatorial orbit satellite type.

30. The BS of claim 25, wherein the high Doppler configuration includes a first discontinuous reception (DRX) parameter that indicates a first set of subframes for UE paging;
   wherein another high Doppler configuration, included in a plurality of candidate high Doppler configurations associated with another BS, includes a second DRX parameter that indicates a second set of subframes for UE paging; and
   wherein the first set of subframes and the second set of subframes are non-overlapping sets of subframes.

* * * * *